UNITED STATES PATENT OFFICE.

FRITZ HOFMANN AND KONRAD DELBRÜCK, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING A CAOUTCHOUC-LIKE SUBSTANCE.

1,068,770.      Specification of Letters Patent.      Patented July 29, 1913.

No Drawing.      Application filed April 16, 1912. Serial No. 691,180.

*To all whom it may concern:*

Be it known that we, FRITZ HOFMANN and KONRAD DELBRÜCK, doctors of philosophy, chemists, citizens of the German Empire, residing at Elberfeld, Germany, have invented new and useful Improvements in Processes of Producing a Caoutchouc-Like Substance, of which the following is a specification.

When beta-gamma-dimethyl-erythrene is allowed to stand for several months it is converted into a solid product of autopolymerization different in its properties from the product obtained by polymerizing this same hydrocarbon by heating. (Kondakow, *Journal für Praktische Chemie*, vol. 64, p. 109.) We have now found that the autopolymerization of beta-gamma-dimethyl erythrene can be materially promoted by carrying it out with the addition of the above referred to autopolymerization product. The product obtained can be used as a substitute for caoutchouc or gutta percha, by treating it with basic substances.

In order to illustrate the new process more fully the following example is given, the parts being by weight:—100 parts of the white product of autopolymerization above referred to obtained from beta-gamma-dimethylerythrene are put together with 300 parts of freshly prepared beta-gamma-dimethylerythrene in a vessel which is closed and kept in the dark during 3–4 weeks. After this time the hydrocarbon is totally converted into the caoutchouc like substance.

We claim:—

The process of producing a caoutchouc like polymerization product which comprises polymerizing beta-gamma-dimethyl erythrene in the presence of an autopolymerization product of beta-gamma-dimethyl erythrene.

In testimony whereof we have hereunto set our hands in the presence of two subscribing witnesses.

FRITZ HOFMANN. [L. S.]
    KONRAD DELBRÜCK. [L. S.]

Witnesses:
    HELEN NUFER,
    ALBERT NUFER.